No. 820,053. PATENTED MAY 8, 1906.
V. LAMB.
PROCESS FOR MAKING HALF TONE ENLARGEMENTS.
APPLICATION FILED DEC. 23, 1904.
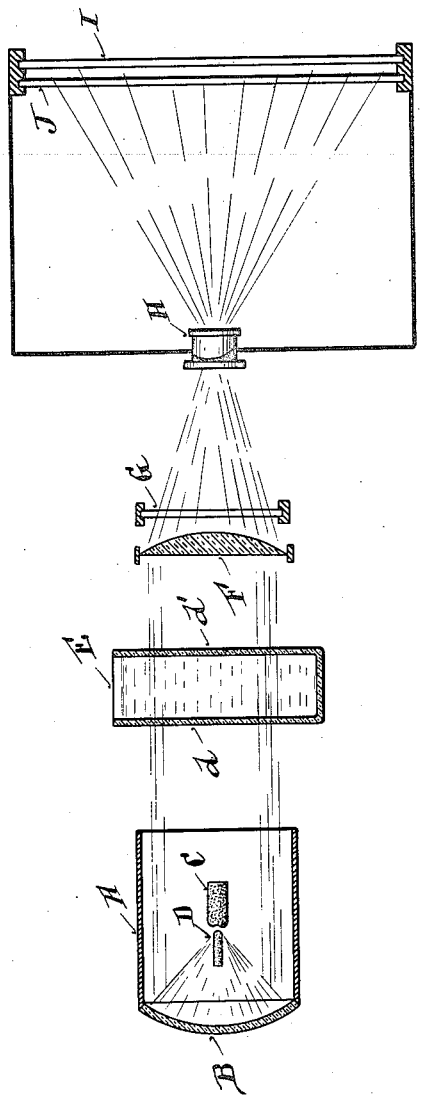

UNITED STATES PATENT OFFICE.

VIRGIL LAMB, OF CINCINNATI, OHIO.

PROCESS FOR MAKING HALF-TONE ENLARGEMENTS.

No. 820,053.　　　　Specification of Letters Patent.　　　　Patented May 8, 1906.

Application filed December 23, 1904. Serial No. 238,044.

*To all whom it may concern:*

Be it known that I, VIRGIL LAMB, a citizen of the United States, residing at Cincinnati, in the county of Hamilton and State of Ohio, have invented certain new and useful Improvements in Processes for Making Half-Tone Enlargements, of which the following is a specification.

My invention relates to a process for creating a half-tone image directly upon a sensitized plate, preferably metal, from a non-half-toned image.

The invention has its most practical realization in enlarging pictures, though the size of the created image is merely an incident depending upon the distance of the metal plate from the objective lens.

The figure represents a diagrammatic elevation of a specific arrangement of the apparatus which may be employed to carry out my process.

A represents an ordinary search-light tube.
B represents the parabola reflector.
C D represent the carbons of the arc-light.
E represents a water-tank having glass sides $d\ d'$ and placed in front of the reflected light.
F represents a condensing-lens. Preferably the image G is the ordinary photographic negative plate, though the process will be operative with a positive plate. By the ordinary plate I mean a plate which has not been subjected to the half-tone process. H represents an objective lens. I place between the two lenses the said plate and at a suitable distance from the objective lens the metal plate. It will be understood that this process so far described projects an image larger than the negative upon the plate. I place a half-tone screen J of the size of the plate I immediately adjacent to the plate, which distance may be slightly varied, according to the quality of the picture desired. This metal plate I has its surface coated with an emulsion which becomes hardened when exposed to light, such as a mixture of glue and bichromate of ammonium. The light-rays which are permitted to pass through the meshes of this screen form hardened spots on the sensitized surface, varying in size with the different degrees of light passing through the small negative plate. At the same time the light-rays deflected around the opaque meshes of the screen by continued exposure spread these spots over an increasing area of the plate, thereby creating the image in thickly-dotted hardened spots, frequently uniting into solid masses. When the exposure has been sufficient to produce the different-sized dots, the plate may be washed with water, which will dissolve out the unfixed portions of the sensitized surface of the plate, thereby leaving the image created on the plate in a thick and matted nebula of hard spots.

In the ordinary half-tone process the enlarged image is projected through a half-tone screen upon a sensitized glass plate, thereby creating the image upon the glass in a series of colored spots of varying size and shade corresponding to the respective light-rays transmitted through the photographic plate and through the meshes of the screen. The image thus formed on the glass plate is a half-tone, which must be transferred to the ordinary zinc plate. This is accomplished by a separate transferring process. My process projects the non-half-tone image of an ordinary photographic plate through a screen and upon a metal plate, thereby creating the half-tone picture directly on the sensitized zinc plate in one single and comparatively short operation.

The prior half-tone processes in common use are more expensive, not only because of the greater length of time and labor required, but also by reason of a greater consumption of material. It is particularly expensive in enlarging work, because the half-tone is formed on a large and expensive glass plate. It is impractical to handle a very large glass plate, and so this half-toning process has limitations in size. Another conventional half-toning process is to form the half-tone picture on a glass plate in one process and then project an enlarged image thereof upon a sensitized metal plate in a second process. This is not only a two-step process, but an inferior quality of image is created, for the reason that the distance between the dots forming the image is increased by the enlarging process. It should be understood that the quality of the enlarged image on a half-tone plate is improved in direct ratio with the density and size of the dots. In my process not only are the dots thickly interspersed, but the spreading of these dots, as above explained, makes a very superior image. It will be understood that after my process the zinc plate is ready for the acid-bath, the subsequent treatment of the plate being of the ordinary character.

Having described my invention, I claim—

The herein-described process of producing an enlarged half-tone printing-plate from an ordinary photograph which consists in projecting a photograph through a magnifying-lens upon a metal plate, the surface of which has been coated with an emulsion adapted to harden upon exposure to the light, interposing a half-tone screen between the lens and plate, and finally treating such plate to produce thereon a printing-surface, substantially as described.

In testimony whereof I have hereunto set my hand.

VIRGIL LAMB.

Witnesses:
OLIVER B. KAISER,
LEO O'DONNELL.